(12) United States Patent
Burkholder

(10) Patent No.: US 9,238,546 B1
(45) Date of Patent: Jan. 19, 2016

(54) MEDIA STORAGE ASSEMBLY

(71) Applicant: Marvin D. Burkholder, Walsenburg, CO (US)

(72) Inventor: Marvin D. Burkholder, Walsenburg, CO (US)

( * ) Notice: Subject to any disclaimer, the term of this patent is extended or adjusted under 35 U.S.C. 154(b) by 163 days.

(21) Appl. No.: 13/932,732

(22) Filed: Jul. 1, 2013

(51) Int. Cl.
  *B65D 85/00* (2006.01)
(52) U.S. Cl.
  CPC .................................... *B65D 85/00* (2013.01)
(58) Field of Classification Search
  USPC ........ 206/307, 307.1, 308.1, 477; 211/40, 11, 211/43, 184, 50, 42
  See application file for complete search history.

(56) References Cited

U.S. PATENT DOCUMENTS

| | | | |
|---|---|---|---|
| 2,908,394 A * | 10/1959 | Thoweman | 211/40 |
| 2,959,293 A * | 11/1960 | Von Meyer | 211/40 |
| 3,347,393 A * | 10/1967 | Frey | 211/40 |
| 5,117,984 A | 6/1992 | Kennedy | |
| 5,211,292 A * | 5/1993 | Paolucci | 211/40 |
| 5,415,297 A * | 5/1995 | Klein et al. | 211/40 |
| 5,547,086 A | 8/1996 | Chen | |
| D382,728 S | 8/1997 | Nemeth | |
| 5,762,208 A | 6/1998 | Yeh | |
| 6,308,839 B1 | 10/2001 | Steinberg et al. | |
| 6,648,150 B2 | 11/2003 | Hartstone | |
| 7,159,956 B1 * | 1/2007 | Hatchell | 312/9.45 |
| 2004/0065629 A1 | 4/2004 | Hunt et al. | |
| 2010/0089787 A1 * | 4/2010 | Trapp | 206/477 |

* cited by examiner

*Primary Examiner* — Jacob K Ackun

(57) ABSTRACT

A media storage assembly holds, organizes, and displays one or more of a user's media collections. The assembly includes a base panel having an upper surface. The upper surface is flat wherein the upper surface is configured to receive a plurality of media thereon. A slot extends into the base panel. A rod is positioned in the slot. A pair of end panels is slidably coupled to the rod. The end panels are slidable to a selectable position on the rod wherein the end panels are configured to abut an outermost one of the media and prevent spacing between adjacently positioned ones of the media.

1 Claim, 4 Drawing Sheets

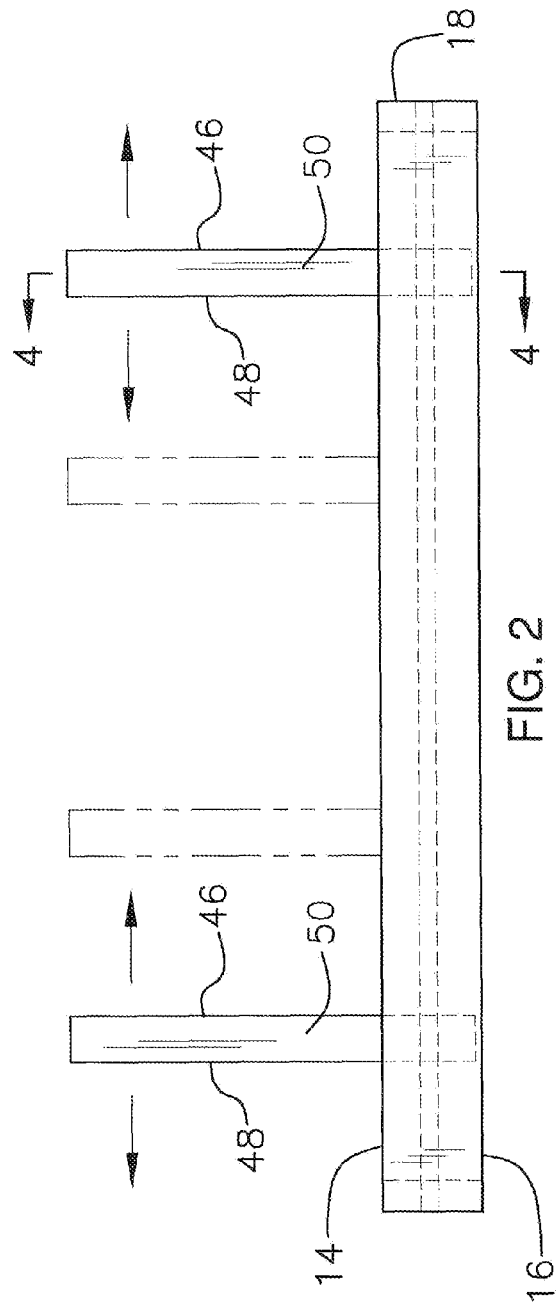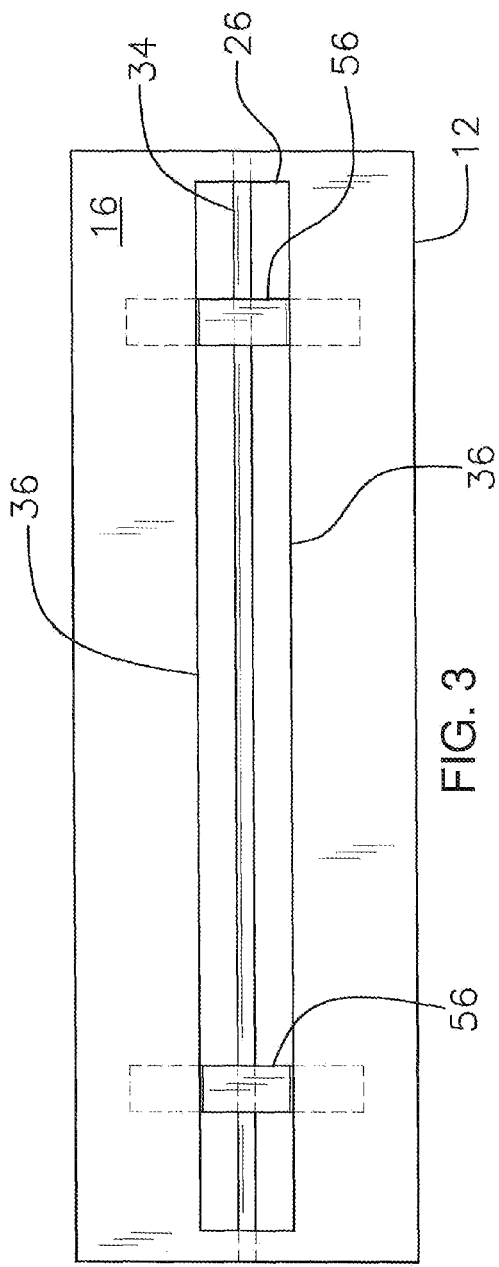

MEDIA STORAGE ASSEMBLY

BACKGROUND OF THE DISCLOSURE

Field of the Disclosure

The disclosure relates to storage assemblies and more particularly pertains to a new storage assembly for holding, organizing, and displaying one or more of a user's media collections.

SUMMARY OF THE DISCLOSURE

An embodiment of the disclosure meets the needs presented above by generally comprising a base panel having an upper surface. The upper surface is flat wherein the upper surface is configured to receive a plurality of media thereon. A slot extends into the base panel. A rod is positioned in the slot. An end panel is slidably coupled to the rod. The end panel is slidable to a selectable position on the rod wherein the end panel is configured to abut an outermost one of the media and prevent spacing between adjacently positioned ones of the media.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a front view of an embodiment of the disclosure.

FIG. 3 is a bottom view of an embodiment of the disclosure.

DESCRIPTION OF THE PREFERRED EMBODIMENT

Figure 1:
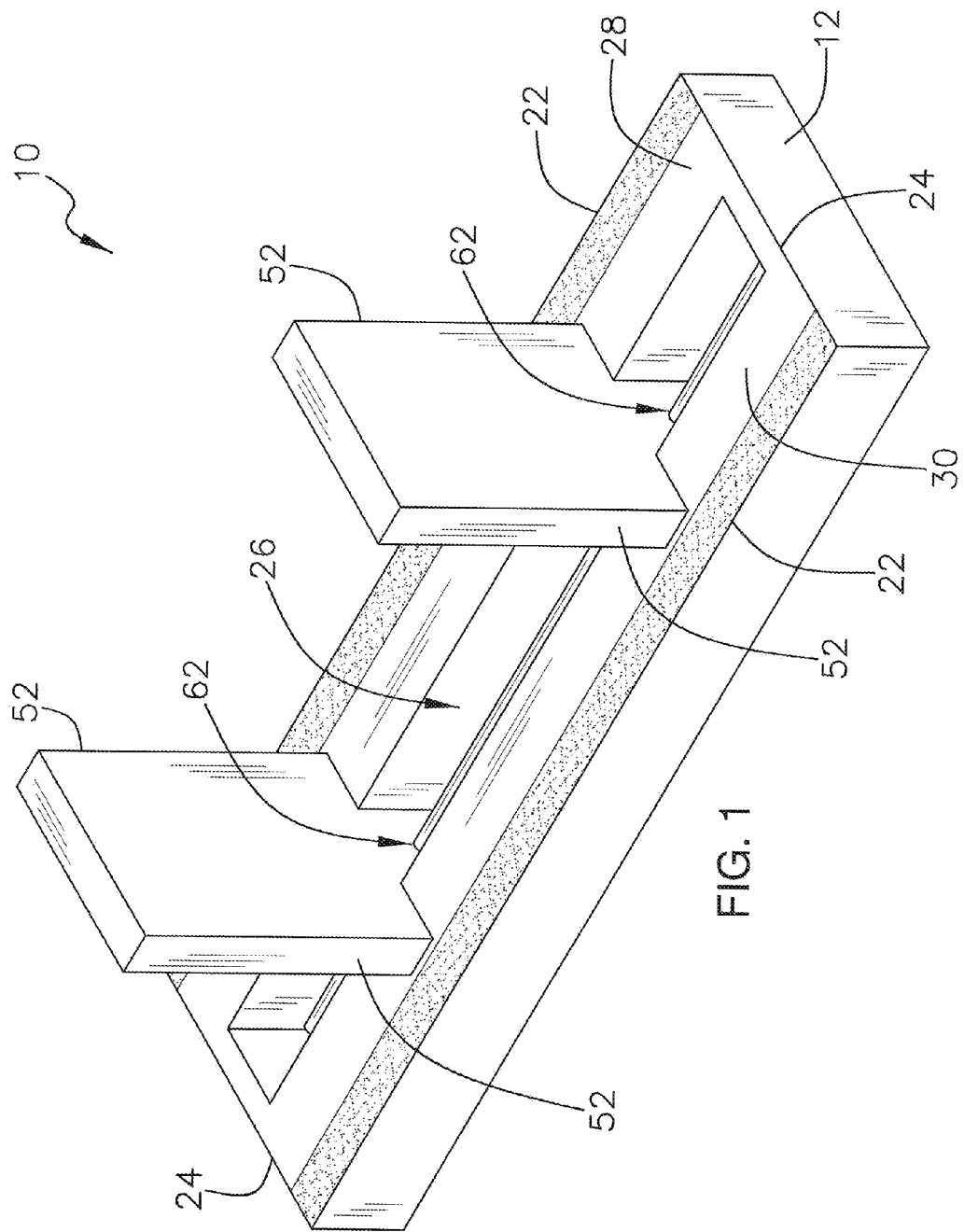
FIG. 1 is a top front side perspective view of a media storage assembly according to an embodiment of the disclosure.
Figure 4:
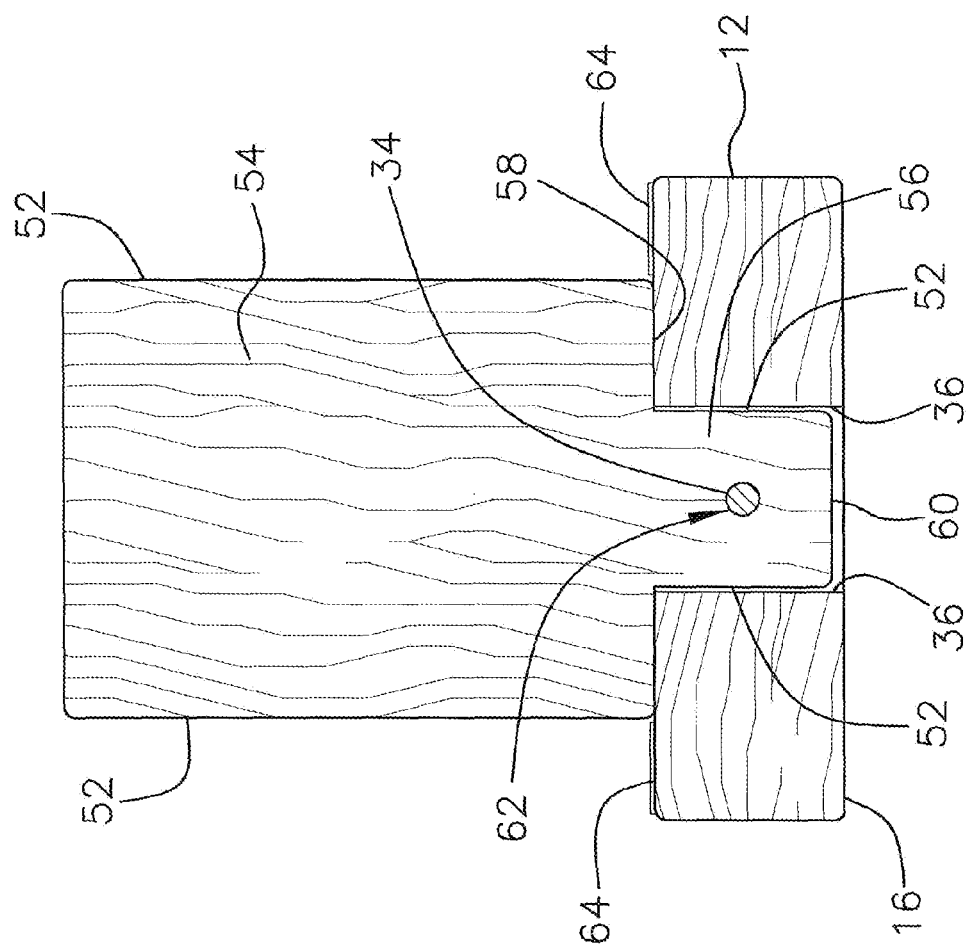
FIG. 4 is a cross-sectional view of an embodiment of the disclosure taken along line 4-4 of FIG. 2.
Figure 5:
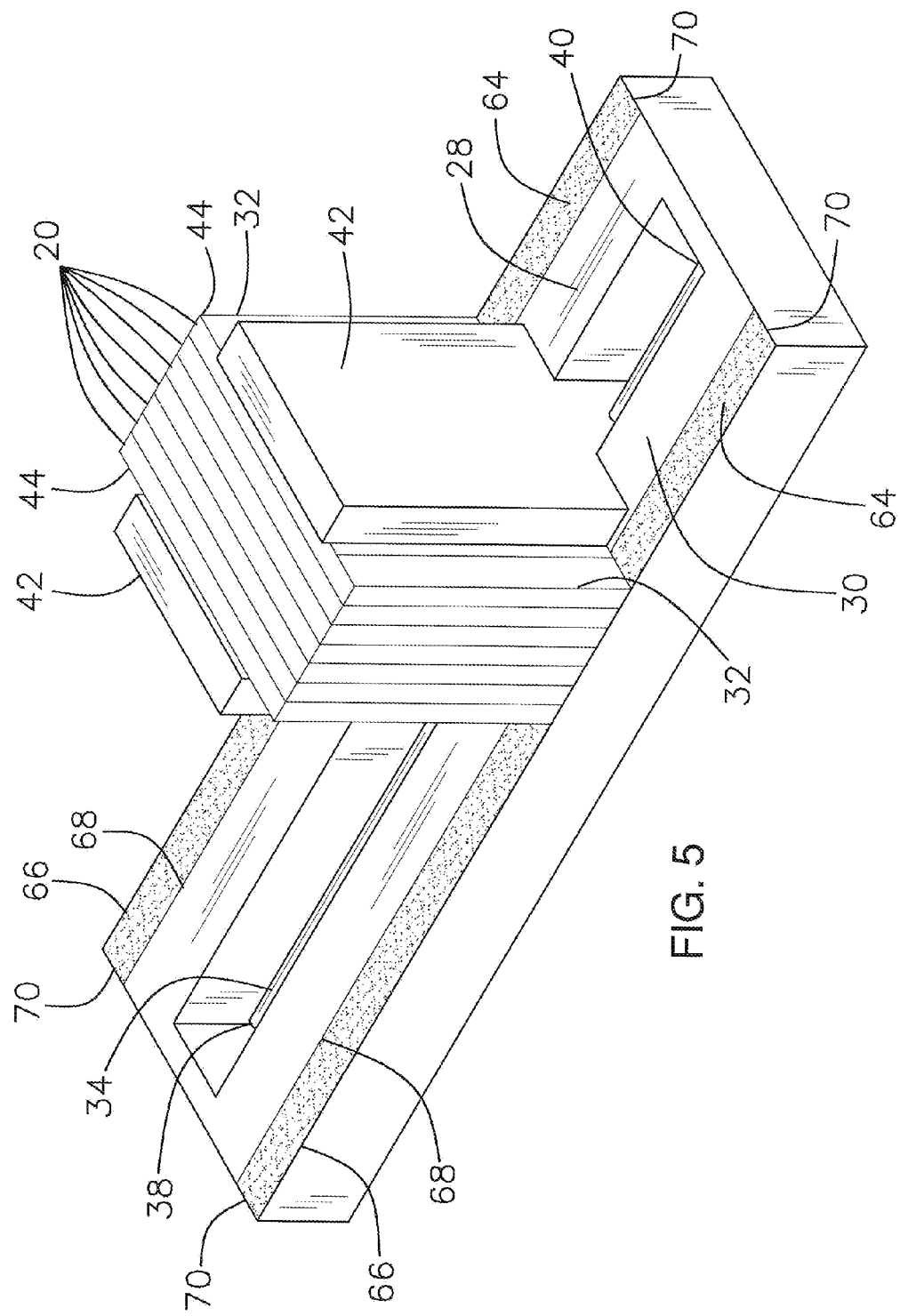
FIG. 5 is an in-use perspective view of an embodiment of the disclosure.

With reference now to the drawings, and in particular to FIGS. 1 through 5 thereof, a new storage assembly embodying the principles and concepts of an embodiment of the disclosure and generally designated by the reference numeral 10 will be described.

As best illustrated in FIGS. 1 through 5, the media storage assembly 10 generally comprises a base panel 12 having an upper surface 14, a lower surface 16, and a perimeter wall 18 coupled to and extending between the upper 14 and lower 16 surfaces. The upper surface 14 is flat wherein the upper surface 14 is configured to receive a plurality of media 20, such as DVDs, CDs or the like, thereon. The perimeter wall 18 may include a pair of opposed long sides 22 and a pair of opposed short sides 24.

A slot 26 extends into the base panel 12. The slot 26 preferably extends longitudinally between the opposed short sides 24. The slot 26 may extend into each of the upper 14 and lower 16 surfaces. The slot 26 is preferably spaced from the perimeter wall 18. The slot 26 defines a first side 28 and a second side 30 of the base panel 12 wherein the first 28 and second 30 sides are configured to support opposite ends 32 of the media 20 when the media 20 are positioned on the upper surface 14 of the base panel 12. A rod 34 is positioned in the slot 26 and preferably extends longitudinally through the slot 26. The rod 34 may be centrally positioned between longitudinal sides 36 of the slot 26. A first end 38 and a second end 40 of the rod 34 may be adhesively coupled to the base panel 12 using glue or the like.

A pair of end panels 42 is slidably coupled to the rod 34. The end panels 42 may be independently slidable relative to each other. The end panels 42 are slidable to a selectable position along a length of the rod 34 wherein the end panels 42 are configured to abut an outermost pair 44 of the media 20 and prevent spacing between adjacently positioned ones of the media 20. Each of the end panels 42 is capable of bi-directional movement along the rod 34. The end panels 42 are positioned parallel with respect to each other.

Each of the end panels 42 comprises a front surface 46, a back surface 48, and a peripheral wall 50 extending between an associated one of the front 46 and back 48 surfaces. Each of the peripheral walls 50 includes a pair of lateral sides 52. Each of the end panels 42 has a top section 54 and a bottom section 56. The bottom section 56 may extend outwardly from a center of a bottom end 58 of the top section 54. The lateral sides 52 of the top section 54 may be offset from the lateral sides 52 of the bottom section 56 of an associated one of the end panels 42. A distance between the lateral sides 52 of the top sections 54 is preferably greater than a distance between the lateral sides 52 of the bottom sections 56. The front surface 46 of each of the top sections 54 may be coextensive with the front surface 46 of an associated one of the bottom sections 56. The back surface 48 of each of the top sections may be coextensive with the back surface 48 of an associated one of the bottom sections 56. The bottom sections 56 of the end panels 42 are positioned within the slot 26. A bottom end 60 of the bottom sections 56 is preferably spaced from the lower surface 16 of the base panel 12. The bottom end 58 of the top sections 54 preferably abuts the upper surface 14 of the base panel 12. The lateral sides 52 of the bottom sections 56 are preferably spaced from the longitudinal sides 36 of the slot 26 to facilitate sliding of the end panels 42 within the slot 26. The lateral sides 52 of the top sections 54 may be parallel with respect to the lateral sides 52 of an associated one of the bottom sections 56. The end panels 42 are preferably constructed from a less dense material than the base panel 12. Each of the end panels 42 and the base panel 12 is preferably constructed from a rigid material, such as wood or the like. The end panels 42 and the base panel 12 are preferably stained to provide for an aesthetically pleasing look.

An aperture 62 is positioned in each of the end panels 42 wherein the apertures 62 are configured to receive the rod 34 therethrough. The apertures 62 are positioned in the bottom sections 56 of the end panels 42.

A pair of strips 64 may be positioned on the upper surface 14 of the base panel 12. Each of the strips 64 has an outer edge 66, an inner edge 68, and a pair of opposed short edges 70. Each of the outer edges 66 is preferably aligned with an associated one of the opposed long sides 22 of the base panel 12. Each of the opposed short edges 70 is preferably aligned with an associated one of the opposed short sides 24 of the base panel 12. Each of the inner edges 68 may be spaced from the longitudinal sides 36 of the slot 26. The strips 64 may be comprised of a non-slip material, such as rubber or the like, wherein the strips 64 are configured to frictionally engage the media 20 when the media 20 are positioned between the end panels 42 and slid along the rod 34. The strips 64 may be formed using a roll-on glue that dries to a rubberized texture.

The slot 26 may have a width between approximately 3.5 centimeters and 4.0 centimeters and may be spaced from the short ends 24 of the base panel 12 a distance between approximately 1.0 centimeter and 2.0 centimeters. The top section 54 of each of the end panels 42 may have a height between approximately 11.0 centimeters and 14.0 centimeters. The width of each of the top sections 54 may be between approximately 8.0 centimeters and 11.0 centimeters. The bottom section 56 of each of the end panels 42 may have a height between approximately 2.0 centimeters and 5.0 centimeters. The base panel 12 may have a length between approximately 43.0 centimeters and 48.0 centimeters. The rod 34 may have a diameter between approximately 0.2 centimeters and 0.6 centimeters. The assembly 10 is preferably sized to receive thirty-six standard DVDs between each of the end panels 42.

In use, as stated above and shown in the Figures, a plurality of media 20 is positioned on the upper surface 14 of the base panel 12 between each of the end panels 42. The end panels 42 are slid along a length of the rod 34 until the end panels 42 abut the outermost pair 44 of the media 20 and prevent spacing between the plurality of media 20. The end panels 42 are slid to accommodate a greater or lesser number of media 20. The strips 64 frictionally engage the media 20 when the media are slid along the rod 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A media storage assembly configured to hold a plurality of media thereon, said assembly comprising:
    a base panel, said base panel having an upper surface, a lower surface, and a perimeter wall coupled to and extending between said upper and lower surfaces, said upper surface being flat wherein said upper surface is configured to receive a plurality of media thereon, said perimeter wall including a pair of opposed long sides and a pair of opposed short sides;
    a slot extending into said base panel, said slot extending longitudinally between said opposed short sides, said slot extending into each of said upper and lower surfaces, said slot being spaced from said perimeter wall, said slot defining a first side and a second side of said base panel wherein said first and second sides are configured to support opposite ends of the media when the media are positioned on said upper surface of said base panel;
    a rod being positioned in said slot, said rod extending longitudinally through said slot, said rod being centrally positioned between longitudinal sides of said slot, a first end and a second end of said rod being adhesively coupled to said base panel;
    a pair of end panels being slidably coupled to said rod, said end panels being independently slidable relative to each other, said end panels being slidable to a selectable position along a length of said rod wherein said end panels are configured to abut an outermost pair of the media and prevent spacing between adjacently positioned ones of the media, each of said end panels being capable of bi-directional movement along said rod, said end panels being positioned parallel with respect to each other, each of said end panels comprising a front surface, a back surface, and a peripheral wall extending between an associated one of said front and back surfaces, each of said peripheral walls including a pair of lateral sides, each of said end panels having a top section and a bottom section, said bottom section extending outwardly from a center of a bottom end of said top section, said lateral sides of said top section being offset from said lateral sides of said bottom section of an associated one of said end panels, a distance between said lateral sides of said top sections being greater than a distance between said lateral sides of said bottom sections, said front surface of each of said top sections being coextensive with said front surface of an associated one of said bottom sections, said back surface of each of said top sections being coextensive with said back surface of an associated one of said bottom sections, said bottom sections of said end panels being positioned within said slot, a bottom end of said bottom sections being spaced from said lower surface of said base panel, said bottom end of said top sections abutting said upper surface of said base panel, said lateral sides of said bottom sections being spaced from said longitudinal sides of said slot, said lateral sides of said top sections being parallel with respect to said lateral sides of an associated one of said bottom sections, said end panels being constructed from a less dense material than said base panel, each of said end panels and said base panel being rigid;
    an aperture positioned in each of said end panels wherein said apertures are configured to receive said rod therethrough, said apertures being positioned in said bottom sections of said end panels; and
    a pair of strips being positioned on said upper surface of said base panel, each of said strips having an outer edge, an inner edge, and a pair of opposed short edges, each of said outer edges being aligned with an associated one of said opposed long sides of said base panel, each of said opposed short edges being aligned with an associated one of said opposed short sides of said base panel, each of said inner edges being spaced from said longitudinal sides of said slot, said strips being comprised of a non-slip material wherein said strips are configured to frictionally engage the media when the media are positioned between said end panels and slid along said rod.

* * * * *